US008098957B2

(12) United States Patent
Hwang et al.

(10) Patent No.: US 8,098,957 B2
(45) Date of Patent: Jan. 17, 2012

(54) SHARED BLOCK COMPARISON ARCHITECHTURE FOR IMAGE REGISTRATION AND VIDEO CODING

(75) Inventors: Hau Hwang, San Diego, CA (US); Hsiang-Tsun Li, San Diego, CA (US); Kalin Atanassov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1009 days.

(21) Appl. No.: 12/030,820

(22) Filed: Feb. 13, 2008

(65) Prior Publication Data

US 2009/0202176 A1     Aug. 13, 2009

(51) Int. Cl.
*G06K 9/32* (2006.01)
*G06K 9/46* (2006.01)
*H04N 7/12* (2006.01)

(52) U.S. Cl. ............... 382/294; 382/232; 375/240.24

(58) Field of Classification Search .............. 382/232, 382/236, 250, 284, 294, 238; 348/393.1, 348/394.1, 395.1, 407.1, 420.1, 422.1; 375/240.11, 375/240.16, 240.21, 240.24
See application file for complete search history.

(56) References Cited

U.S. PATENT DOCUMENTS

| | | | | |
|---|---|---|---|---|
| 5,652,625 A * | 7/1997 | Chen et al. | ............... | 375/240.16 |
| 6,130,911 A * | 10/2000 | Lei | ............... | 375/240.16 |
| 6,285,711 B1 * | 9/2001 | Ratakonda et al. | ...... | 375/240.16 |
| 6,411,652 B1 * | 6/2002 | Sivan | ............... | 375/240.16 |
| 6,430,317 B1 * | 8/2002 | Krishnamurthy et al. | .... | 382/236 |
| 6,496,538 B1 * | 12/2002 | Drysdale | ............... | 375/240.16 |
| 6,501,799 B1 * | 12/2002 | Kohn | ............... | 375/240.16 |
| 7,359,559 B2 * | 4/2008 | Mauro et al. | ............... | 382/236 |
| 7,362,918 B2 * | 4/2008 | Herley | ............... | 382/284 |
| 7,837,624 B1 * | 11/2010 | Hossack et al. | ............... | 600/443 |

OTHER PUBLICATIONS

Ely S R: "MPEG Video a Simple Introduction" EBU Review-Technical, European Broadcasting Union. Brussels, BE, No. 266, Dec. 21, 1995, pp. 12-23, XP000559446 ISSN: 0251-0936.
European Search Report—Application No. 08006422, International Search Authority—European Patent Office—Apr. 1, 2009.
Evans O D et al: "Efficient Implementation of Image Warping on a Multimedia Processor" Real-Time Imaging, Academic Press Limited, GB, vo 1. 4, No. 6, Dec. 1, 1998, pp. 417-428, XP004419567 ISSN: 1077-2014 * p. 425, col. 1, paragraph 2 *.
International Search Report and Written Opinion—PCT/US2009/033966, International Search Authority—European Patent Office—Sep. 4, 2009.

(Continued)

*Primary Examiner* — Kanjibhai Patel
(74) *Attorney, Agent, or Firm* — Matthew J. Evans; James R. Gambale, Jr.

(57) ABSTRACT

This disclosure describes an efficient architecture for an imaging device that supports image registration for still images and video coding of a video sequence. For image registration, the described architecture uses block-based comparisons of image blocks of a captured image relative to blocks of another reference image to support image registration on a block-by-block basis. For video coding, the described architecture uses block-based comparisons, e.g., to support for motion estimation and motion compensation. According to this disclosure, a common block comparison engine is used on a shared basis for both block-based image registration and block-based video coding. In this way, a hardware unit designed for block-based comparisons may be implemented so as to work in both the image registration process for still images and the video coding process for coding a video sequence.

35 Claims, 5 Drawing Sheets

OTHER PUBLICATIONS

Kang S B et al: "High dynamic range video" ACM Transactions on Graphics, ACM, US, vol. 22, No. 3, Jul. 27, 2003, pp. 319-325, XP002305364 ISSN: 0730-0301 * abstract *.

Kevin Hilman et al: "Using Motion-Compensated Frame-Rate Conversion for the Correction of 3 2 Pulldown Artifacts in Video Sequences" IEEE Transactions on Circuits and Systems for Video Technology, IEEE Service Center, Piscataway, NJ, US, vol. 10, No. 6, Sep. 1, 2000, XP011014096 ISSN: 1051-8215 8figures 2,4 *.

Srinivasan et al: "Predictive Coding Based on Efficient Motion Estimation" IEEE Transactions on Communications, IEEE Service Center, Piscataway, NJ, US, vol. 33, No. 8, Aug. 1, 1985, pp. 888-896, XP007907284 ISSN: 0090-6778 * p. 888, col. C, paragraph 2 *.

* cited by examiner

SHARED BLOCK COMPARISON ARCHITECHTURE FOR IMAGE REGISTRATION AND VIDEO CODING

TECHNICAL FIELD

This disclosure relates to image and video processing and, more particularly, techniques for image registration and stabilization in image capture applications and techniques for video coding in video capture applications.

BACKGROUND

In imaging devices, the images or video sequences captured by such devices are often susceptible to quality degradation due to inadvertent shaking of the devices during image capture. In video capture, shaking of the imaging device can result in undesirable motion or jitter in the captured video sequence. In still image capture, the shaking may result in blurring of the captured image. Blurring or jitter can make it difficult for the human visual system to focus and concentrate on a region or object of interest within the image. In either case, the quality of the viewing experience of the video or image is reduced.

Image registration techniques can be used to compensate for inadvertent shaking to produce better image quality. Image registration systems generally fall into three main categories: optical image stabilizers (OIS), mechanical image stabilizers (MIS), and electronic image stabilizers (EIS). OIS systems employ an adjustable lens that morphs the image before it reaches the sensor to reduce the effect of shaking. MIS systems stabilize the entire camera, e.g., using the center of gravity of the camera, a counterbalance system, and/or the camera operator's body to minimize shaking. EIS systems employ signal processing algorithms to alter the captured images and thereby address the effects of shaking. In some image processing applications, image registration may also be used to fuse a short sequence of images into one picture. EIS systems may be less expensive to implement than OIS and MIS systems, and may be preferred over OIS and MIS systems for devices such as wireless radio telephone handsets equipped with imaging capabilities, e.g., so-called camera phones.

For video capture, imaging devices may implement block-based video compression techniques, such as those defined by the MPEG-2, MPEG-4, ITU-T H.261, H.263, or H.264/MPEG-4, Part 10, Advanced Video Coding (AVC) standards. Video compression techniques perform spatial and temporal prediction to reduce or remove redundancy inherent in video sequences. Motion estimation and motion compensation, for example, are common and effective block-based video coding techniques used to remove temporal redundancy in a coded video sequence, and thereby achieve data compression.

SUMMARY

This disclosure describes an efficient architecture for an imaging device that supports image registration for still images and video coding of a video sequence. For the image registration, the described architecture may use block-based comparisons of image blocks of a captured image relative to blocks of another reference image to support image registration on a block-by-block basis. Optionally, pixel-based registration may also be used in the image registration for any blocks for which adequate matching blocks are not identified in a reference image. For the video coding, the described architecture may use block-based comparisons, e.g., to support for motion estimation and motion compensation.

According to some aspects of this disclosure, the block-based comparisons may be performed via a block comparison engine that forms part of both the image registration architecture and the video coding architecture. In other words, this disclosure describes the use of a shared block comparison engine for block-based image registration and block-based video coding. In this way, a hardware unit designed for block-based comparisons may be implemented so as to work in both the image registration process for still images and the video coding process for coding a video sequence.

In one example, this disclosure provides a method comprising performing a video coding process on image frames of a video sequence, wherein performing the video coding process includes comparing video blocks of an image frame being coded to video blocks of a search space using a block comparison engine, and performing an image registration process, wherein performing the image registration process includes comparing blocks of a first image to blocks of a second image using the block comparison engine.

In another example, this disclosure provides an apparatus comprising a block comparison engine, a video coder that performs a video coding process on image frames of a video sequence, wherein the video coding process includes comparing video blocks of an image frame being coded to video blocks of a search space using the block comparison engine, and an image registration unit that performs an image registration process, wherein the image registration process includes comparing blocks of a first image to blocks of a second image using the block comparison engine.

In another example, this disclosure provides a device comprising means for performing a video coding process on image frames of a video sequence, wherein means for performing the video coding process includes means for comparing video blocks of an image frame being coded to video blocks of a search space using a block comparison engine, and means for performing an image registration process, wherein means for performing the image registration process includes means for comparing blocks of a first image to blocks of a second image using the block comparison engine.

Various aspects of the techniques described in this disclosure may be implemented in hardware, software, firmware, or combinations thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. The software may be executed in an imaging device that includes a block comparison engine, as described herein. Software instructions that execute the techniques may be initially stored in a computer-readable medium and loaded and executed by a processor of the imaging device.

Accordingly, this disclosure also contemplates computer-readable media comprising a computer-readable medium comprising instructions that upon execution in a processor of an imaging device that includes a block comparison engine, causes the processor to perform a video coding process on image frames of a video sequence, wherein the video coding process includes comparing video blocks of an image frame being coded to video blocks of a search space using the block comparison engine, and perform an image registration process, wherein the block-based image registration process includes comparing blocks of a first image to blocks of a second image using the block comparison engine.

The details of one or more examples are set forth in the accompanying drawings and the description below. Other features, objects, and advantages will be apparent from the description and drawings, and from the claims.

DETAILED DESCRIPTION

Figure 1:
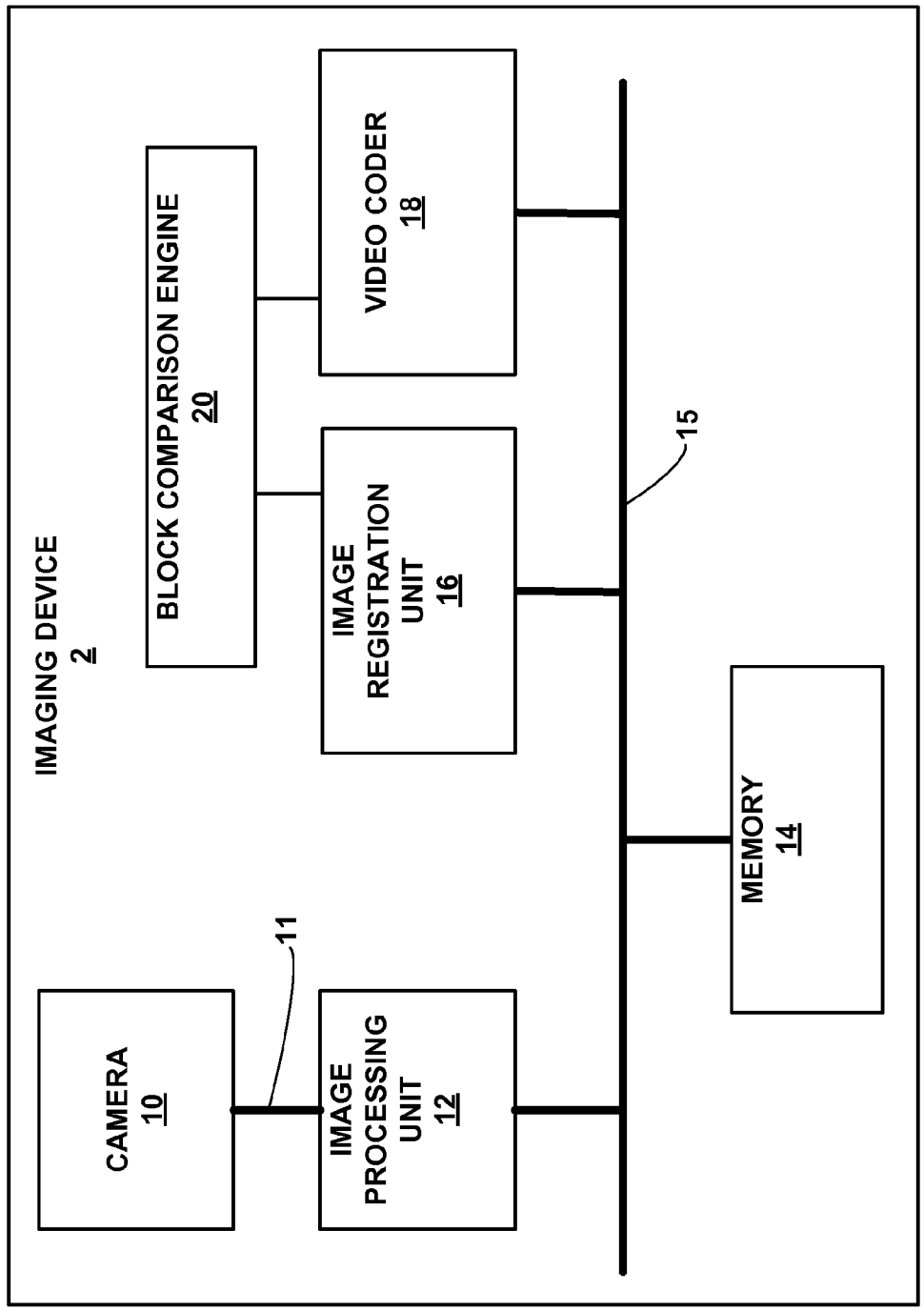
FIG. 1 is a block diagram illustrating an example imaging device that includes a block comparison engine used by both an image registration unit and a video coder.

Imaging devices, especially those that are small and lightweight, such as so-called camera phones, are highly susceptible to undesirable movements by a user of the device during image capture. Such undesirable movements, sometimes referred to as hand jitter, generally result in a reduced image quality due to blurring or other visual artifacts. To compensate for the movements, the imaging device may provide image stabilization using the image registration techniques described in this disclosure. In general, image registration refers to a technique in which two or more still images are captured, aligned and combined to form a composite ("registered") still image. Image registration may be used to reduce jitter in a combined still image relative to the two or more still images, or to combine two or more images to fuse a sequence of images into one picture.

For the image registration, the architecture described herein uses block-based comparisons of image blocks of a captured image relative to blocks of another reference image to support image registration on a block-by-block basis. Two or more images may be broken into blocks or windows, which may be similar to so-called "macroblocks" defined in video coding. These blocks or windows may be compared to blocks or windows of another image to support image registration on a block-by-block basis. The blocks may be disjoint, joint (non-overlapping) or overlapping. Optionally, pixel-based registration may also be used for any blocks for which adequate matching blocks are not identified in a reference image.

This disclosure describes an efficient architecture for an image capture device that supports image registration for still images and video coding of a video sequence using common block comparison engine on a shared basis. By sharing the block comparison engine for both image registration and video coding, it may be possible to reduce size, processing and memory overhead in the imaging device.

For the video coding, the described architecture also uses block-based comparisons, e.g., to support for motion estimation and motion compensation. According to this disclosure, as described above, the block-based comparisons may be performed via a block comparison engine that forms a shared part of both the image registration architecture and the video coding architecture. In other words, this disclosure describes the use of a shared block comparison engine for use in block-based image registration and block-based video coding. In this way, a hardware unit designed for block-based comparisons may be implemented so as to work in both the image registration process for still images and the video coding process for coding a video sequence. The image registration process could also be used in conjunction with video capture, in which each image frame of the video sequence is a registered frame associated with multiple short exposure images. In this case, the image registration associated with the generation of image frames, and the video coding process for coding such image frames of a sequence would still use the same block comparison engine.

FIG. 1 is a block diagram illustrating an example imaging device 2 that includes a block comparison engine 20 used by both an image registration unit 16 and a video coder 18. Although block comparison engine 20 is illustrated as a separate component, it may actually form part of both image registration unit 16 and video coder 18. Block comparison engine 20 may comprise a hardware unit invoked by image registration unit 16 during image registration, and by video coder 18 during video coding. Alternatively, block comparison engine 20 may comprise a hardware unit that is essentially integrated with both image registration unit 16 and video coder 18 such that it forms part of both image registration unit 16 and video coder 18. Image registration unit 16 and video coder 18 may be implemented in hardware, software, firmware, or any combination thereof.

Imaging device 2 may comprise a digital camera that supports one or more digital still image capture modes and video capture modes. Imaging device 2 may comprise a stand-alone imaging device, such as a stand-alone camera, or may form part of another device, such as a wireless handset, commonly referred to as a cellular radiotelephone. As an example, imaging device 2 may comprise a so-called camera phone or video phone. In this case, device 2 may include many other components, such as a receiver, a transmitter, a modem, and an antenna to facilitate wireless communication. These wireless communication components are not shown for simplicity and ease of illustration.

As shown in FIG. 1, imaging device 2 may include a camera 10 coupled to an image processing unit 12 via a dedicated bus 11. Image device 2 may define an "in-line" architecture that automatically processes still images and/or video frames as the images or frames are captured by camera 10. The techniques of this disclosure, however, do not require camera 10 and processing unit 12. On the contrary, the video coding and image registration processes described herein, which use the same block comparison engine, could also be applied with respect to data that has already been captured by another device, data sent from another device, data that is already stored in memory 14, and so forth.

Camera 10 may support still image capture in which a short sequence of images is captured with relatively short exposure times for each image, and then combined to form a registered still image as described herein. Camera 10 may also support video capture in which a sequence of frames is captured and encoded to form a video sequence. The image registration process is primarily described herein as being part of an image capture mode, but could also be used during video capture, e.g., in which each image frame of the video sequence is itself a registered frame formed based on two or more exposures.

Camera 10 may include a two-dimensional array of individual image sensor elements, e.g., arranged in rows and columns. In some aspects, each of the image sensor elements of camera 10 may be associated with a single pixel. In other words, there may be a one-to-one correspondence between image sensor elements and pixels. Alternatively, there may be more than one image sensor element associated with each pixel or more than one pixel associated with each image sensor element. Camera 10 may comprise, for example, an array of solid state sensors such as complementary metal-oxide semiconductor (CMOS) sensors, charge coupled device (CCD) sensors, or any other sensor elements used in digital camera applications. Moreover, camera 10 may maintain one or more image buffers to which camera 10 immediately stores image information for the captured images. Camera 10 may include one or more lenses, shutters, a flash device to illuminate an image scene, and possibly a display, if desired. The architecture illustrated in FIG. 1 is merely exemplary, as the techniques described in this disclosure may be implemented with a variety of other architectures.

To capture an image, camera 10 exposes its sensor elements to the image scene. The image sensor elements within camera 10 may, for example, capture intensity values representing the intensity of the light of the scene at a particular pixel position. In some cases, each of the image sensor elements of camera 10 may only be sensitive to one color, or color band, due to the color filters covering the sensors. For example, camera 10 may comprise an array of sensors with appropriate filters so as to define red, green and blue sensors. Camera 10 may utilize other types of color filters, however, such as CMYK color filters, or other types of color filters. Each of the image sensors of camera 10 may capture intensity values for only one color. The image information may include pixel intensity and/or color values captured by the sensor elements of camera 10.

Image processor unit 12 receives raw image data from camera 10, and may perform any of a wide variety of image processing techniques on such data. Image processing unit 12 may be referred to as an imaging "front end," and may perform such functions as scaling, white balance, color balance, cropping, signal noise reduction, sharpening or any other front end image data processing. The captured image data is stored in memory 14. Image processing unit 12, memory 14, image registration unit 16 and video coder 18 may be communicatively coupled to one another via a shared data communication bus 15.

Memory 14 may comprise any form of volatile or non-volatile memory, such as read-only memory (ROM), a form of random access memory (RAM), electrically erasable programmable read-only memory (EEPROM), FLASH memory, or some type of data storage drive or unit. Typically, memory 14 may be implemented as some type of RAM or FLASH memory to ensure fast data transfer between the different components of device 2.

Image registration unit 16 may be used during a still image capture mode of device 2, whereas video coder 18 may be used during video capture mode. Image registration unit 16 may combine two or more images to form a registered image. During the image capture mode, for example, rather than capture a long exposure image (e.g., a 1 second image), camera 10 may capture a few successive short exposure images (e.g., four successive 0.25 second images). Image registration unit 16 may combine the four successive 0.25 second images into a registered image. The registered image may have improved image quality relative to an image exposed for 1 second. In this way, registration may improve the quality of still images, e.g., by reducing jitter.

Video coder 18 may be used during video capture. Video coder 18 may perform video compression according to a standard such as MPEG-2, MPEG-4, ITU-T H.261, H.263, or H.264/MPEG-4, Part 10, Advanced Video Coding (AVC). In this way, video coder 18 compresses a sequence of video frames to form a coded video sequence. Again, image registration need not be limited to image capture mode, but could also be used in video capture mode such that each image frame of a video sequence is a registered frame generated based on two or more image exposures.

According to the techniques of this disclosure, block comparison engine 20 is used by both image registration unit 16 and video coder 18. Again, although block comparison engine 20 is illustrated as a separate component, it may actually form part of both image registration unit 16 and video coder 18. Alternatively, block comparison engine 20 may be viewed as a separate component that is invoked by image registration unit 16 during image registration, and invoked by video coder 18 during video coding. Either way, image registration unit 16 and video coder 18 both make use of block comparison engine 20. In this way, duplication of block comparison engine 20 can be avoided in imaging device 2 in order to make the architecture of device 2 more efficient. For example, a shared block comparison engine 20 may yield an integrated circuit with less chip area (less silicon) than would be needed if separate block comparison engines were used. Memory requirements may also be reduced by implementing block comparison engine 20 relative to a software-only solution. In addition, processing speed may be improved relative to other architectures or software-only solutions.

Image registration 16 may perform block-based image registration. In this case, images are partitioned into blocks of pixels (referred to in this disclosure as "blocks"). The blocks represent contiguous portions of the image information, and may be referred to as "windows" or by other terminology. In some cases blocks defined for image registration may be similar to so-called "macroblocks" "partitions" or "sub-partitions" defined in the H.264 video coding standard. The blocks have any size, such as 16×16 pixels, 8×8 pixels, 4×8 pixels, 8×4 pixels, 4×4 pixels, or any other size. In video coding contexts, blocks may be referred to as macroblocks, partitions or sub-partitions, but in image registration, the blocks may be referred to as windows or by other terminology. The blocks may comprise sets of image data in the pixel domain or in a transform domain, such as a discrete cosign transform (DCT) domain. For example, the blocks may comprise pixel values or transform coefficient values that that form a square or rectangular shape. The blocks may be disjoint, joint (non-overlapping) or overlapping.

Image registration module 16 performs a block-based image registration process in which blocks of a first image (the current image) are compared with blocks of a second image (a reference image). The first and second images may comprise successive images with short exposure times, as explained above. If more than two images are being combined in the registration process, the second image may itself be a registered version of two exposures, and the first image may be a third exposure to be combined with the registered combination of the first two exposures. In order to accelerate this comparison process, image registration module 16 uses block comparison engine 20. Block comparison engine 20 compares the blocks of the first image with those of the second image. Image registration unit 16 identifies matches and combines the blocks of the first image with the matching blocks of the second image. Image registration unit 16 forwards registered blocks to memory 14 in order to assemble a registered image in memory 14 in a block-by-block manner.

In combining the blocks of the first image with those of the second image, image registration unit 16 may average the pixel values, e.g., intensity and/or color values, of pixels of the most recently captured image with the pixel values of pixels of a temporally prior image. Image registration unit 16 may use a straight average of the first and second images, a weighted average of the first and second images, a sum of the first and second images, or any other techniques for combining the image information of the two or more images for image registration. Image registration unit 16 may store the averaged pixel values at the pixel location of the most recently captured image in memory 14. In this manner, image registration unit 16 may replace the pixel values of the pixels of one of the captured images with the averaged pixel values during image registration. This averaged image information (i.e., pixel values) typically exhibits less blur than un-registered image information, thus providing enhanced image quality, especially in instances where the above mentioned shaking or movements occur. The averaged image data may also cause the registered image to exhibit less blur and possibly less noise than the first and second images.

According to this disclosure, image registration can occur on a block-by-block basis. However, in some cases, if adequately matching blocks are not identified for some of the blocks, pixel-by-pixel comparisons may be performed by image registration unit 16 for such blocks. Image registration may be used to combine multiple short exposures of a scene and merge these multiple exposures together to reduce noise, increase signal, and improve image sharpness. Issues such as lighting differences and perspective shifts (rotations, translations) are the challenges for this type of processing. Additional details of the image registration process are provided below.

Video coder 18 implements block-based video compression techniques, such as those defined by the MPEG-2, MPEG-4, ITU-T H.261, H.263, or H.264/MPEG-4, Part 10, Advanced Video Coding (AVC) standards. In particular, video coder 18 may perform spatial and temporal prediction to reduce or remove redundancy inherent in sequences of video frames captured by camera 10 and processed by image processing unit 12. Spatial prediction reduces redundancy between neighboring video blocks within a given video frame captured by camera 10. Temporal prediction, also known as motion estimation and compensation, reduces temporal redundancy between video blocks in past and/or future video frames of a video sequence.

For temporal prediction, a video coder 18 performs motion estimation to track the movement of matching video blocks between two or more adjacent frames. Video coder 18 may define motion vectors to indicate the displacement of video blocks relative to corresponding prediction video blocks in one or more reference frames of a search space. Motion compensation uses the motion vectors to identify prediction video blocks from a reference frame. A residual video block is formed via subtraction operations, e.g., by subtracting the prediction video block from the original video block to be coded. The residual video block can be sent to a video decoder along with the motion vector.

In order to make the block-based comparisons necessary for spatial and temporal prediction, video coder 18 uses the same block comparison engine 20 that is used by image registration unit 16 for the block-based comparisons in image registration. However, rather than combine blocks of data (as done by image registration unit 16), video coder 18 subtracts blocks from one another to form residual blocks. Since the block-based comparison operations preformed for image registration are similar to the block-based comparison operations performed for video coding, the same block comparison engine 20 can be used by both image registration unit 16 and video coder 18. Again, a shared block comparison engine 20 may yield an integrated circuit device with less chip area (less silicon) than would be needed if separate block comparison engines were used. Memory requirements may also be reduced by implementing block comparison engine 20 relative to a software-only solution. In addition, processing speed may be improved relative to other architectures or software-only solutions.

In the discussion below, video coder 18 is primarily described as performing temporal prediction, e.g., motion estimation and motion compensation. Nevertheless, video coder 18 may also perform spatial prediction, and may implement block comparison engine 20 for such spatial prediction. In this case, however, the blocks of a given video frame are compared to other blocks of that same video frame in order to define similarities that can be used to spatially compress the data.

Block comparison engine 20 may comprise a hardware unit. Image registration unit 16 and video coder 18 may be implemented as hardware, software, firmware, or any of a wide variety of combinations of hardware, software or firmware. Image registration unit 16 and video coder 18 may be realized by one or more microprocessors, digital signal processors (DSPs), application specific integrated circuits (ASICs), field programmable gate arrays (FPGAs), or any other equivalent discrete or integrated logic circuitry, or a combination thereof. In some embodiments, video coder 18 may comprise an encoder-decoder (CODEC) that supports encoding and decoding functionality.

Figure 2:
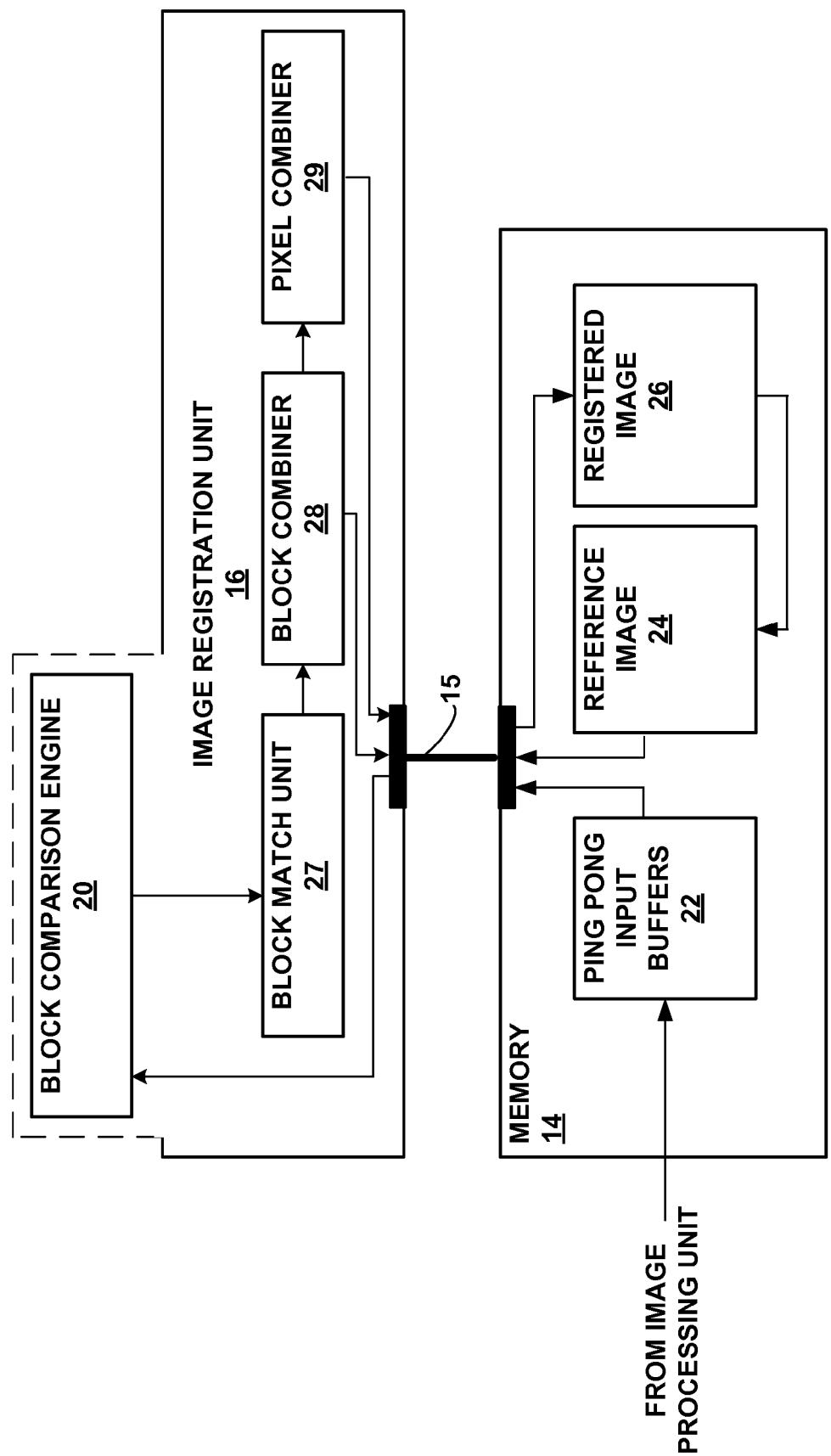
FIG. 2 is a block diagram of an exemplary image registration unit coupled to memory consistent with the techniques of this disclosure.
Figure 3:
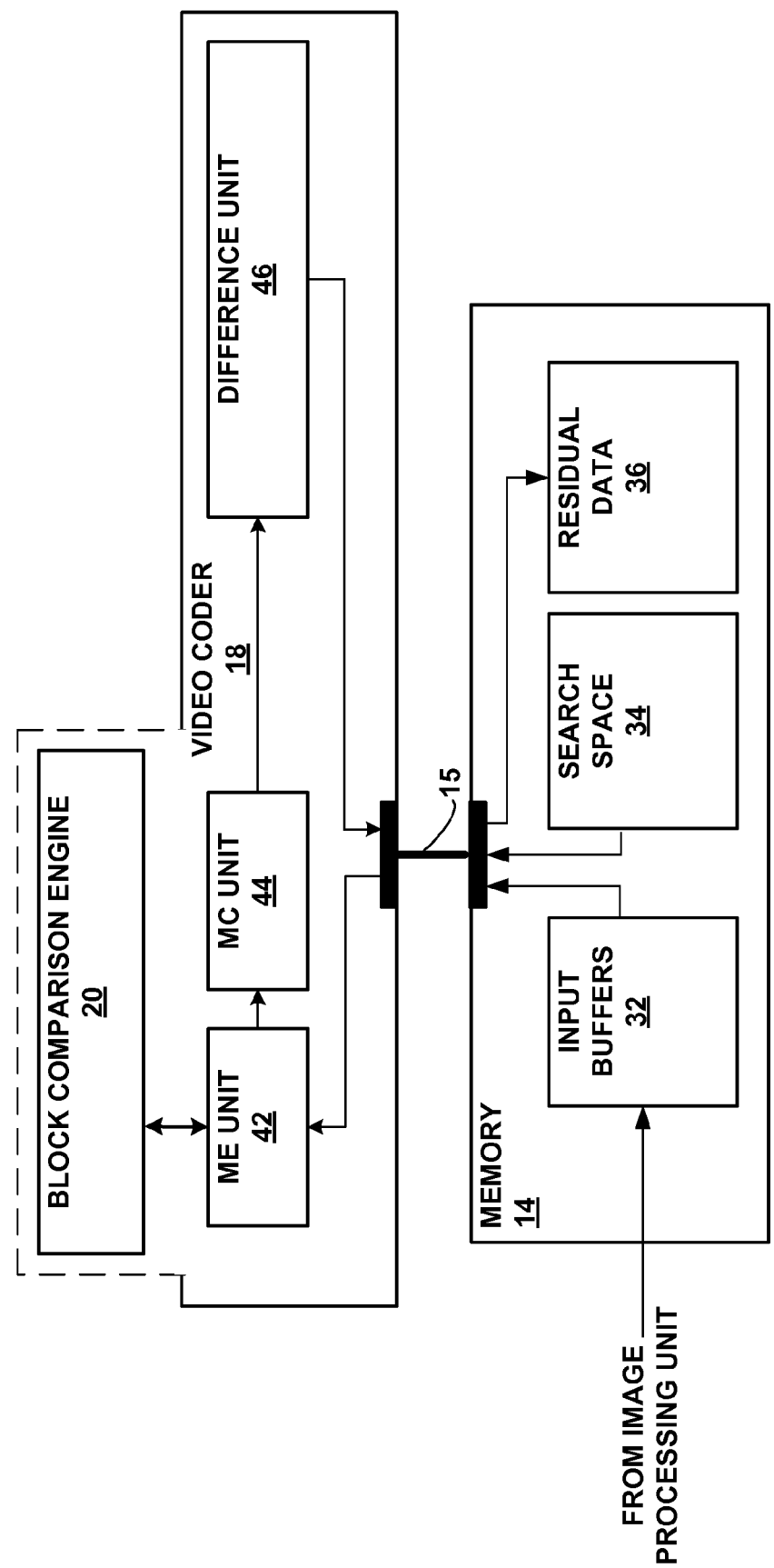
FIG. 3 is a block diagram of an exemplary video coder coupled to memory consistent with the techniques of this disclosure.

FIG. 2 is a block diagram of an exemplary image registration unit 16 coupled to memory 14 consistent with the techniques of this disclosure. The illustrated components in FIG. 2 are one example of image registration unit 16 and memory 14 shown in FIG. 1. As shown in FIG. 2, memory 14 receives image data from an image processing unit (such as unit 12 of FIG. 1). In FIGS. 2 and 3, the same block comparison engine 20 is illustrated. Dotted lines surround block comparison engine 20 to illustrate the notion that block comparison engine 20 forms part of image registration unit 16 (FIG. 2), but also forms part of video coder 18 (FIG. 3). As noted above, block comparison engine 20 may be viewed as an engine that is invoked by image registration unit 16 and by video coder 18, or may be viewed as a hardware unit that is integrated as part of image registration unit 16 and video coder 18.

The input may be received in memory at ping pong input buffers 22 in a block-by-block manner. Ping pong input buffers 22 may comprise a so-called "ping pong" buffer arrangement. In this case, data is only stored in buffers 22 as long as it is needed, and is overwritten once such data is processed in image registration unit 16. For example, a first image block may be stored in ping pong input buffers 22 and forwarded to image registration unit 16 for processing. At this point, a second block of data may be received in ping pong input buffers 22 from image processing unit 12. Once the first block of data is processed by image registration unit 16, the second block of data may be forwarded to image registration unit 16. At this point, a third block of data may be received in ping pong input buffers 22. Moreover, this third block of data may overwrite the first block of data in ping pong input buffers 22. This achieves an efficient use of memory 14 such that data need not be stored in memory 14 once it has been processed by image registration unit 16. Data may be transferred between memory 14 and image registration unit 16 over a data communication bus 15.

Ping pong input buffers 22 may include storage space for any number of blocks, but generally support overwrites of data blocks once such blocks have been processed. As further explanation, a ping pong input buffers 22 may include two or more parallel buffers. When writing to one buffer, data may be read from another, and vice versa. Accordingly, ping pong buffers 22 may support substantially simultaneous overwriting of one buffer while reading from the other such that read and write operations are ping-ponged in an alternating basis between two or more parallel buffers.

Image registration unit 16 performs an image registration process in a block-by-block manner. In particular, image registration unit 16 receives a block of data of a first image from ping pong input buffers 22, and receives a set of blocks associated with a second image (e.g., reference image 24). Reference image 24 may be a previously captured image (previous in a short temporal sequence associated with still image capture), or may comprise a composite registered image associated with two or more previously captured images.

Image registration unit 16 invokes block comparison engine 20 to compare the block of the first image to the one or more blocks of the second image. Block comparison engine 20 compares the pixels of the block of the first image to the pixels of the different blocks of the second image, and generates matching values indicative of the level of matching between the block of the first image and the different blocks of the second image. Block comparison engine 20 may implement Sum of Absolute Difference (SAD) techniques, Sum of Squared Difference (SSD) techniques, or any other suitable comparison techniques to generate the matching values. Block match unit 27 receives the matching values from block comparison engine 20 and compares such values to one or more thresholds to determine whether an adequate match has been identified.

The SAD technique involves the tasks of performing absolute difference computations between values of the block of the first image, with pixel values of the block of the second (reference) image. The results of these absolute difference computations are summed, i.e., accumulated, in order to define a value indicative of the difference between the blocks. As examples, for an 8 by 8 pixel block, 64 differences may be computed and summed, and for a 16 by 16 pixel block, 256 differences may be computed and summed. A lower difference values generally indicates that a block being compared to another block is a better match.

The SSD technique also involves the task of performing difference computations between pixel values of the block of the first image, with pixel values of the block of the second (reference) image. In the SSD technique, the results of absolute difference computations are squared, and then the squared values are summed, i.e., accumulated, in order to define a difference value indicative of the difference between the blocks. Alternatively, block comparison engine 20 could implement other comparison techniques such as a Mean Square Error (MSE), a Normalized Cross Correlation Function (NCCF), or another suitable comparison technique.

If an adequate match is identified by block match unit 27, block combiner 28 combines the block of the first image with the matching block of the second image to create a registered block, e.g., by averaging or otherwise combining the values of corresponding pixels in the blocks. The registered block is then sent from block combiner 28 of image registration unit to memory 14, where it is used to assemble part of registered image 26. In order to combine blocks, as mentioned above, block combiner 28 may perform addition operations, averaging operations, weighted averaging operations, or any operations commonly used in image registrations processes to combine corresponding pixel values within matching blocks.

On the other hand, if an adequate match is not identified by block match unit 27, one of a few different possibilities may occur. In one example, if an adequate match is not identified by block match unit 27, block combiner 28 may avoid any combining, and may forward the block of the first image directly to memory 14 for use in assembling registered image 26. In this case, that given block of registered image may simply include the data associated with the block of the first image, without any combination with a block of the second image. In some cases, if block combiner 28 avoids combining for any reason, block combiner 28 may choose between blocks of the first and second image and forward the chosen block. In this case, the choice may be made based on known or measured properties of the blocks, e.g., the block exhibiting the least noise may be forwarded when combination is avoided.

Alternatively, if an adequate match is not identified by block match unit 27, block combiner 28 may forward the block of the first image and the best match (albeit not good enough for block combination) to pixel combiner 29. In this case, pixel combiner 29 may perform pixel-based comparisons of the block of the first image relative to the pixels of the best matching block identified by block comparison engine 20 and block match unit 27. Pixel combiner 29 may combine sufficiently matching pixels of the block of the first image with those of the best matching block of the second image. Any pixels that do not have adequate matching, however, may remain uncombined. After generating a registered block with one or more combined pixels, pixel combiner 29 may forward the registered block to memory, where the registered block is stored for use in assembling registered image 26. Pixel combiner 29 is optional, and may be eliminated in some embodiments.

In some cases, once registered image 26 is fully assembled, registered image 26 is then used as reference image 24. This is particularly useful if three or more images are being combined in the image registration process. In this case, the first two images are combined in the block-by-block manner to generate registered image 26, which then becomes reference image 24. Then, the third image is compared and combined with reference image 24 to generate a new registered image 26, which at this point is a combination of three images. This process could continue for any number of images to be combined into a registered image. Any image may be treated as the first reference image if the registration process is performed offline, e.g., with respect to pre-captured images or data that is already available and not captured in real-time.

As noted above, block comparison engine 20 is not only used for block-based comparisons for image registration, but is also used for block-based comparisons for video coding. FIG. 3 is a block diagram of an exemplary video coder 18 coupled to memory 14 consistent with the techniques of this disclosure. The illustrated components in FIG. 3 are one example of video coder 18 and memory 14 shown in FIG. 1. As shown in FIG. 3, memory 14 receives data from an image processing unit (such as unit 12 of FIG. 1). This data is a sequence of image frames that form a video sequence.

The input may be received in memory at input buffers 32. Input buffers 32 may be similar to ping pong input buffers 22, and may comprise a so-called "ping pong" buffer arrangement, e.g., as previously described. Input buffers 32, however, could be arranged according to many other types of buffer arrangements.

For video coding, memory 14 stores blocks of a first image frame in input buffers 32, and stores a search space 34. Search space 34 may comprise a collection of pixels (or blocks of pixels) corresponding to a previously coded image frame of the video sequence (or possibly a subsequent frame for bi-directional prediction). The search space may comprise the previous or subsequent frame in its entirety, or a subset of the frame, if desired. The search space may be rectangular-shaped or may assume any of a wide variety of shapes and sizes.

Video coder 18 receives a block of an image frame to be coded from input buffers 32, and receives search space 34. Data may be communicated from memory 14 to video coder 18 via data communication bus 15. Video coder 16 includes a motion estimation (ME) unit 42, a motion compensation (MC) unit 44, and a difference unit 46. In the example of FIG. 3, block comparison engine 20 forms part of video coder 18, and may be viewed as a comparison engine invoked by ME unit 42, or may be viewed as an integrated part of ME unit 42. Video coder 18 is illustrated as including ME unit 42 and MC unit 44 for motion based temporal coding, but could also include components for spatial prediction coding, and such components may also use the same block comparison engine 20. Spatial prediction components are not shown in FIG. 3 for simplicity and ease of illustration.

Inter-coding via ME unit 42 and MC unit 44 relies on temporal prediction to reduce or remove temporal redundancy between blocks of successive image frames of a video sequence. For inter-coding, ME unit 42 tracks the movement of matching blocks between two or more adjacent frames. Motion estimation generates motion vectors, which indicate the displacement of blocks relative to corresponding prediction blocks in one or more reference frames. MC unit 44 uses the motion vector to generate the prediction block from a reference frame. After motion compensation, difference unit 46 generates a residual block by subtracting the prediction block from the original block to be coded. The residual block and the motion vector used to generate the residual block may be communicated from video coder 16 to memory 14, where such data is stored and assembled as residual data 36 of an encoded frame of a video sequence.

Again, according to this disclosure, the same block comparison engine 20 used by image registration unit 16 is also used by video coder 18 to facilitate block comparisons. In video coding, however, the block comparisons facilitate block-based coding of a video sequence rather than image registration. Block comparison engine 20 may implement SAD techniques, SSD techniques, or any suitable block comparison techniques, as outlined above.

If desired, video coder 18 may apply transform, quantization and entropy coding processes to further reduce the bit rate associated with the residual block. Transform techniques may comprise discrete cosine transformation (DCT). Quantization may include quantizing coefficients to a reduced level of resolution to improve compression. Entropy coding may include variable length coding, binary arithmetic coding (CABAC), Huffman coding, run-length coding, coded block pattern (CBP) coding, or the like. These additional components are not illustrated in FIG. 3 for simplicity and ease of illustration. These or other coding methodologies may aid in data compression of the residual data, particularly if the data is to be transmitted between devices.

Figure 4:
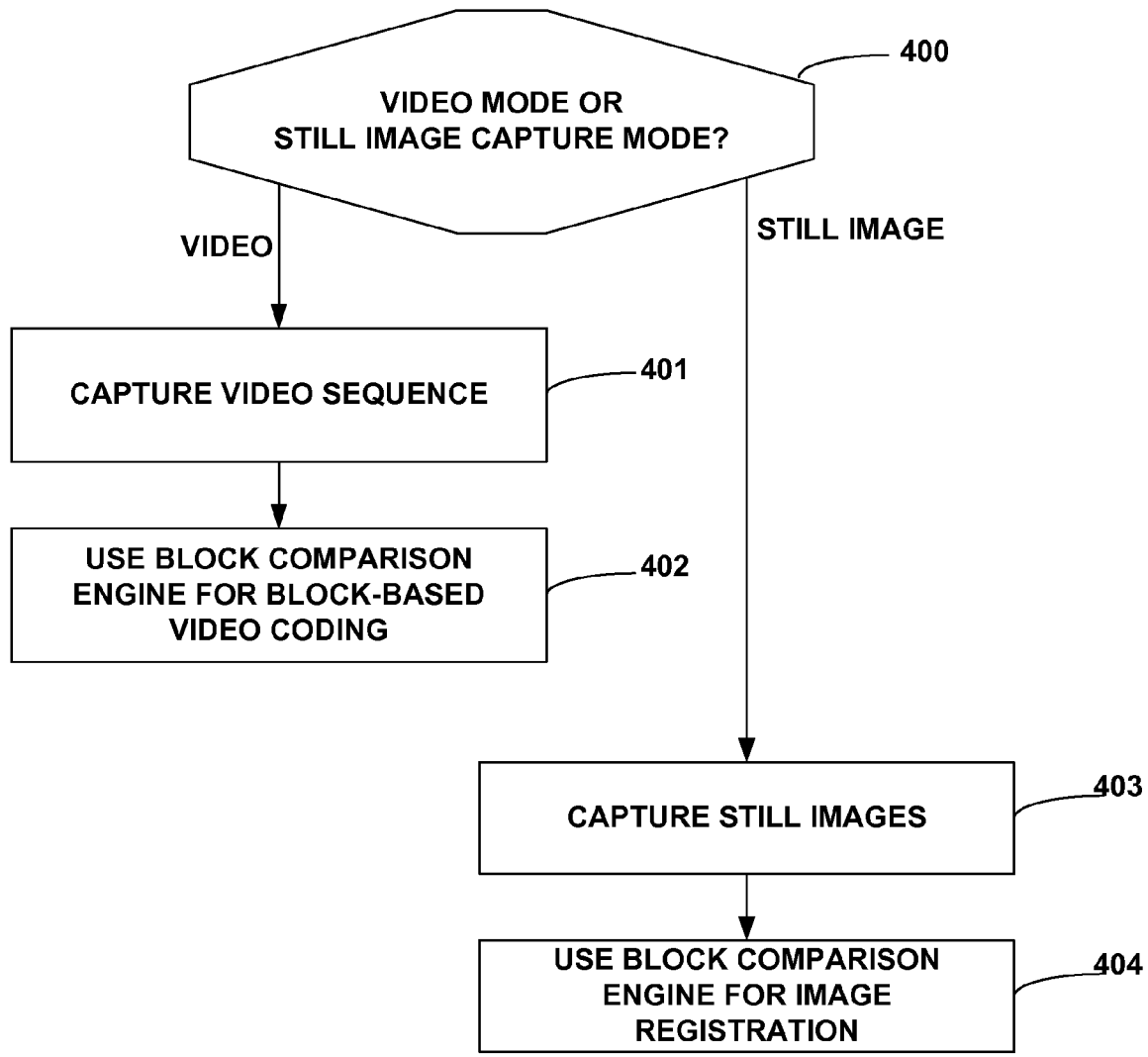
FIG. 4 is a flow diagram illustrating example operation of an imaging device performing image registration and video coding in accordance with this disclosure.

FIG. 4 is a flow diagram illustrating example operation of an imaging device 2 performing image registration and video coding in accordance with this disclosure. As noted above, the techniques of this disclosure do not require any image capture, but could be applied with respect to data that has already been captured by another device, data sent from another device, data that is already stored in memory, and so forth. Nevertheless, FIG. 4, which shows the image capturing steps, is illustrative of the techniques described herein in this context. As shown in FIG. 4, imaging device 2 operates in a video mode or a still image capture mode (400). When imaging device 2 is video mode (video branch of 400), camera 10 of imaging device 2 captures a video sequence (401). Video coder 18 of imaging device 2 uses block comparison engine 20 to perform block-based video coding on the captured video sequence (402).

Alternatively, when imaging device 2 is still image capture mode (still image branch of 400), imaging device 2 captures still images (403). In this case, image registration unit 16 of imaging device 2 uses block comparison engine 20 to image registration (404). In this way, block comparison engine 20 performs dual functionality, accelerating the image registration process and the video coding process. Although the image registration process is described as being primarily applicable to still images, the image registration process could also be used to register image frames of a video sequence, e.g., prior to video encoding.

In short, device 2 performs a video coding process on image frames of a video sequence, wherein performing the video coding process includes comparing video blocks of an image frame being coded to video blocks of a search space using block comparison 20 engine. In addition, device 2 performs an image registration process, wherein performing the image registration process includes comparing blocks of a first image to blocks of a second image using the block comparison engine 20. The techniques may be applied in devices that capture images and video, or in devices that simply store images and video.

As described herein, the video coding process includes motion estimation using block comparison engine 20, motion compensation, and difference computations between the video blocks of the image frame being coded and matching video blocks of the search space. The difference computations comprise subtraction operations. The image registration process includes using block comparison engine 20 to compare blocks of the first and second images, and combining matching blocks of the first and second images to generate blocks of a registered image. The combination of matching blocks may comprise at least one of addition operations and averaging operations.

Reduced chip area associated with block comparison engine 20 and reduced latency are two advantages that may be achieved by sharing block comparison engine 20 for video coding and image registration. By implementing a shared engine for image registration, the need for adding dedicated chip space in an integrated circuit for image registration can be avoided. Moreover, by implementing a hardware-based block comparison engine 20 for the video coding and image registration, the processing may be accelerated compared to a software-only solution for video coding and image registration.

Figure 5:
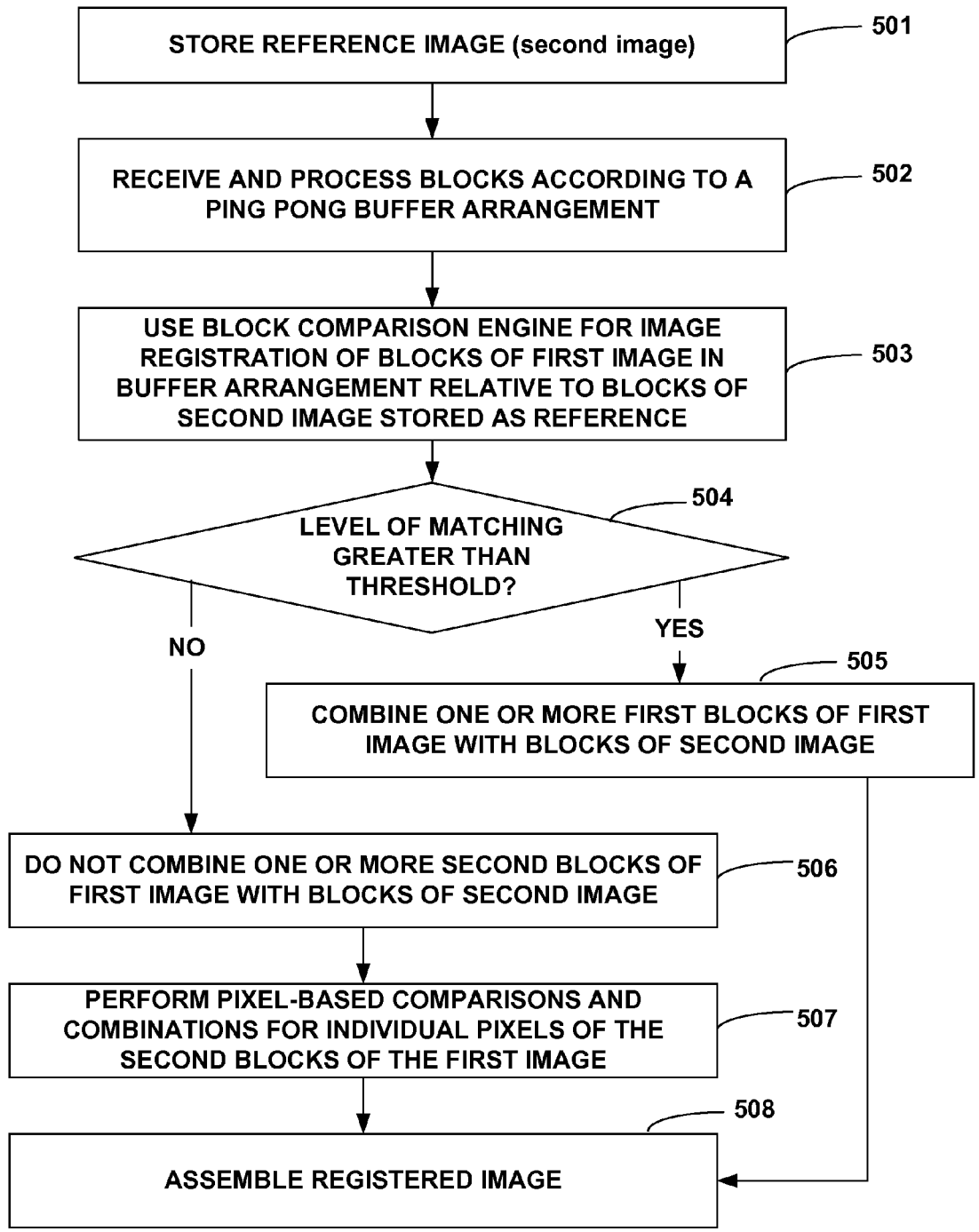
FIG. 5 is a flow diagram illustrating an exemplary image registration process consistent with this disclosure.

FIG. 5 illustrating an exemplary image registration process consistent with this disclosure. As shown in FIG. 5, memory 14 stores a reference image (which may be referred to as the "second image"). Memory 14 receives and processes blocks of a first image to be registered according to a ping pong buffer arrangement (402), which may be implemented via ping pong input buffers 22. In this case, ping pong input buffers 22 buffer the blocks of the first image in a buffer arrangement such that when a given block of the first image is combined with a given block of the second image to generate a given block of the registered image, the given block of the first image is overwritten in the buffer arrangement. As further explanation, a ping pong buffer arrangement usually has two or more parallel buffers. When writing to one buffer, data may be read from another, and vice versa.

Image registration unit 16 uses block comparison engine 20 for image registration of blocks of the first image in input buffers 22 relative to blocks of a second image stored as a reference image 24 (503). Block match unit 27 determines whether any reference blocks have a level of matching with the blocks of the first image that is greater than a threshold (504). If block match unit 27 identifies a level of matching greater than the threshold for one or more "first" blocks of the first image (yes branch of 504), block combiner 28 combines the one or more first blocks with the respective blocks of the first image to generate registered blocks (505).

If block match unit 27 does not identify a level of matching greater than the threshold for one or more "second" blocks of the first image (no branch of 504), block combiner 28 does not combine the one or more second blocks with blocks of the first image to generate registered blocks (506). Instead, block combiner forwards these second blocks to pixel combiner 29. Pixel combiner 29 performs pixel-based comparisons and combinations for individual pixels of the second blocks of the first image (507). More details of such pixel-based combinations are discussed below. Alternatively, the "second" blocks for which matching blocks are not identified, may be stored in the registered image without any combination with blocks of the reference image.

Registered image 26 is assembled in memory 14 (508). In particular, image registration unit 18 writes the registered blocks to memory 14 in a block-by-block manner in order to assemble registered image 26. This registered image 26 may include fully registered blocks from block combiner 28, and blocks that have one or more registered pixels and one or more non-registered pixels from pixel combiner 29. Registered image 26 may be stored as a final registered image, or may be used as reference image 24 if additional images are to be combined for multi-image registration.

In accordance with this disclosure, performing the image registration process may include receiving the blocks of the first image in a block-by-block manner, combining the blocks of the first image with the blocks of the second image to generate registered blocks of a registered image, buffering the blocks of the first image in a buffer arrangement such that when a given block of the first image is combined with a given block of the second image to generate a given block of the registered image, the given block of the first image is overwritten in the buffer arrangement, and assembling the registered blocks to generate the registered image.

In some cases, if a sufficient matching block is not identified for a given block, the given block may be stored as a registered block without any combination with the reference blocks of reference image 24. In other cases, the image registration process may include combining first blocks of the first image with blocks of the second image to generate registered blocks of a registered image when a threshold level of matching is identified, not combining second blocks of the first image with blocks of the second image when the threshold level of matching is not identified, and for the second blocks of the first image, performing pixel based comparisons relative to pixels of the second image, and combining one or more pixels of the second blocks of the first image with pixels of the second image to generate registered pixels.

The image registration process may involve combining blocks of two or more images in a combined image relative to the two or more images. This may be used to achieve hand-jitter reduction, i.e., to reduce jitter caused by motion of the image capture device during image capture. Alternatively, image registration as described in this disclosure may be used to effectuate so called high-dynamic range processing. In high-dynamic range processing, multiple pictures of the scene are captured using different exposures. Some of the pictures are overexposed to capture shadow details, some pictures are underexposed to retain highlights, while some are exposed for the mid-tones in the scene.

By having flexibility in an image registration unit 20, multiple exposures can be combined into a high-dynamic range image in real-time using an in-line architecture, as described herein. In yet another example, the image registration process may include combining blocks of two or more images to fuse a sequence of images into one picture. In this case, image registration may be performed to fuse a sequence of images together to form one picture that captures motion, such as the progression of someone walking or running.

As described herein, image registration is a procedure where two or more images are combined (e.g., added or averaged) together. The two or more images may have horizontal and vertical pixel shifts (if needed) to align corresponding objects or features in the images. Pixel shifts can be position independent (constant through the entire image) or position dependent (not constant thorough the image). Block-based registration divides the first image into blocks (e.g., blocks of 8 pixels, 16 pixels, or 32 pixels) and for every block forms a search for block from a second image (reference image) that is closest to the block being registered. The image registration process, e.g., performed by image registration unit 18, may be represented by:

$$V, H = \min_{v,h} \sum_{i,j \in M} |S1(i, j), S2(i+h, j+v)|_{DIST}$$

where V and H represent values of v and h that minimize the summation,

S1 represents a block from the first image,
S2 represents a block from the second image
i and j span over the block space,
h and v are hypothesized horizontal and vertical offsets between the two blocks,
M represents a macroblock support space (e.g., 8×8, 16×16, or the like),
the operation ($|\ |_{DIST}$) represents a generic way of measuring the distance between two vectors,
min represents a minimization operation, and
Σ represents a summation operation.

As an alternative, a squared distance calculation may be used to define block similarity. If squared distance is used to define block similarity, then the image registration process, e.g., performed by image registration unit 18, may be represented by:

$$V, H = \min_{v,h} \sum_{i,j \in M} (S1(i, j) - S2(i+h, j+v))^2$$

Once the block offsets are estimated, image registration unit 18 may use the block offsets to generate pixels offset and combine the two images in a block-by-block manner. For this type of block-based implementation the pixel offset within the block may be assumed to be constant and the same block offset is used for all the pixels in the given block.

However, due to the possibility that a perfect match between a particular block from the first image and a block of the second (reference) image might not exist (e.g., because blocks from the second image may be rotated or moved in some way that eliminates block matching), it might not be possible to combine such blocks with a simple shift. One way to resolve the issue (which might arise when there are moving object in the scenes) is to not combine blocks for image registration if a close enough match is not found. Further, one way to verify whether the above minimization result is a close match is to establish a predetermined threshold in order to decide if blocks will be combined or only the first block will be used in the final image. This process may be represented by:

$$\sum_{i,j \in M} (S1(i, j) - S2(i+H, j+V))^2 < T \rightarrow \text{combine}$$

where T represents the predetermined threshold. Thus, if the summation above is less than threshold T, the two blocks will be combined by image registration unit 18, and if the summation above is equal to or greater than threshold T, the two image blocks will not be combined by image registration unit 18.

The decision of whether to combine blocks based on the threshold may additionally include singling out blocks that do not have an adequate match (due to rotation or out of range movement) and to threat such blocks differently. However since the decision is made by image registration unit 18 based on total block difference, it is possible that the cumulative (or average) difference is relatively small for some pixels of the block, and large for other pixels of the block. In this case, a pixel level decision may be made to combine pixels (or not combine pixels) based on measured pixel differences. This may be the function of an optional pixel combiner 28, as shown in FIG. 2.

In implementations that support pixel-based comparisons for blocks that do not have adequate block matches, the difference between the pixels RGB vectors may be used according to;

$$\sqrt{(R1-R2)^2 + (G1-G2)^2 + (B1-B2)^2} < M \rightarrow \text{combine}$$

where R1, G1 and B1 are the red, green, and blue components for pixels from a block of the first image and image R2, G2 and B2 are the red, green, and blue components for pixels from a block of the second image (reference) image. M may represent a pixel-based threshold below which combination occurs. Thus, if the computation above is less than M, then pixel combiner 28 may perform pixel-based combination for that given pixel, and if the computation above is greater than or equal to M, then pixel combiner 28 may avoid combination for that given pixel.

The techniques described herein may be implemented in hardware, software, firmware or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above and implements a block comparison engine to do so. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more DSPs, general purpose microprocessors, ASICs, field programmable logic arrays FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Hence, the disclosure also contemplates any of a variety of integrated circuit devices that include circuitry to implement one or more of the techniques described in this disclosure. Such circuitry may be provided in a single integrated circuit chip or in multiple, interoperable integrated circuit chips.

Various techniques have been described. These and other example aspects are within the scope of the following claims.

The invention claimed is:

1. A method comprising:
   performing a video coding process on image frames of a video sequence, wherein performing the video coding process includes comparing video blocks of an image frame being coded to video blocks of a search space using a block comparison engine; and
   performing an image registration process, wherein performing the image registration process includes comparing blocks of a first image to blocks of a second image using the block comparison engine.

2. The method of claim 1,
   wherein the video coding process includes motion estimation using the block comparison engine, motion compensation, and difference computations between the video blocks of the image frame being coded and matching video blocks of the search space, and
   wherein the image registration process includes combining matching blocks of the first and second images to generate blocks of a registered image after comparing the blocks of the first image to the blocks of a second image using the block comparison engine.

3. The method of claim 2,
   wherein the difference computations comprise subtraction operations, and
   wherein combining matching blocks comprises at least one of applying addition operations and applying averaging operations.

4. The method of claim 1, wherein performing the image registration process includes:
   receiving the blocks of the first image in a block-by-block manner;
   combining the blocks of the first image with the blocks of the second image to generate registered blocks of a registered image;
   buffering the blocks of the first image in a buffer arrangement such that when a given block of the first image is combined with a given block of the second image to generate a given block of the registered image, the given block of the first image is overwritten in the buffer arrangement; and
   assembling the registered blocks to generate the registered image.

5. The method of claim 1, wherein performing the image registration process includes:

combining first blocks of the first image with blocks of the second image to generate registered blocks of a registered image when a threshold level of matching is identified;

not combining second blocks of the first image with blocks of the second image when the threshold level of matching is not identified; and for the second blocks of the first image, performing pixel based comparisons relative to pixels of the second image, and combining one or more pixels of the second blocks of the first image with pixels of the second image to generate registered pixels.

6. The method of claim 1, wherein performing the image registration process includes combining blocks of two or more images to reduce jitter in a combined image relative to the two or more images.

7. The method of claim 1, wherein performing the image registration process includes combining blocks of two or more images to fuse a sequence of images into one picture.

8. The method of claim 1, wherein performing the image registration process includes combining blocks of the first and second images, and wherein the first and second images are captured using different exposures.

9. An apparatus comprising:
a block comparison engine;
a video coder that performs a video coding process on image frames of a video sequence, wherein the video coding process includes comparing video blocks of an image frame being coded to video blocks of a search space using the block comparison engine; and
an image registration unit that performs an image registration process, wherein the image registration process includes comparing blocks of a first image to blocks of a second image using the block comparison engine.

10. The apparatus of claim 9, wherein
the video coder includes a motion estimation unit that uses the block comparison engine, a motion compensation unit, and a difference computation unit that performs difference computations between the video blocks of the image frame being coded and matching video blocks of the search space, and
the image registration unit includes the block comparison engine to perform the image registration process by comparing blocks of the first and second images, a block match unit to identify matching blocks, and a combination unit that performs combination of the matching blocks of the first and second images to generate blocks of a registered image.

11. The apparatus of claim 10,
wherein the difference computations comprise subtraction operations, and
wherein the combination of matching blocks comprises at least one of: addition operations and averaging operations.

12. The apparatus of claim 9, wherein the apparatus includes a memory comprising a buffer arrangement, wherein for the image registration process:
the memory receives the blocks of the first image in a block-by-block manner;
the image registration unit combines the blocks of the first image with the blocks of the second image to generate registered blocks of a registered image;
the memory buffers the blocks of the first image in a buffer arrangement such that when a given block of the first image is combined with a given block of the second image to generate a given block of the registered image, the given block of the first image is overwritten in the buffer arrangement; and
the image registration unit sends the registered blocks to the memory to assemble the registered image.

13. The apparatus of claim 9, wherein the image registration unit includes:
a block matching unit that determines whether a threshold level of matching exists between one or more blocks of the first image relative to one or more blocks of the second image;
a block combiner that combines first blocks of the first image with blocks of the second image to generate registered blocks of a registered image when the threshold level of matching is identified, and does not combine second blocks of the first image with blocks of the second image when the threshold level of matching is not identified; and
a pixel combiner that, for the second blocks of the first image, performs pixel based comparisons of pixels of the second blocks of the first image relative to pixels of the second image, and combines one or more pixels of the second blocks of the first image with pixels of the second image to generate registered pixels.

14. The apparatus of claim 9, wherein performing the image registration process includes combining blocks of two or more images to reduce jitter in a combined image relative to the two or more images.

15. The apparatus of claim 9, wherein performing the image registration process includes combining blocks of two or more images to fuse a sequence of images into one picture.

16. The apparatus of claim 9, wherein performing the image registration process includes combining blocks of the first and second images, and wherein the first and second images are captured using different exposures.

17. The apparatus of claim 9, wherein the apparatus comprises a wireless handset that includes an imaging device.

18. The apparatus of claim 9, wherein the apparatus comprises an integrated circuit.

19. The apparatus of claim 9, wherein the apparatus comprises an imaging device.

20. A non-transitory computer-readable storage medium comprising instructions that upon execution in a processor of an imaging device that includes a block comparison engine, causes the processor to:
perform a video coding process on image frames of a video sequence, wherein the video coding process includes comparing video blocks of an image frame being coded to video blocks of a search space using the block comparison engine;
and perform an image registration process, wherein the block-based image registration process includes comparing blocks of a first image to blocks of a second image using the block comparison engine.

21. The non-transitory computer-readable storage medium of claim 20,
wherein the video coding process includes motion estimation using the block comparison engine, motion compensation, and difference computations between the video blocks of the image frame being coded and matching video blocks of the search space, and
wherein the image registration process includes combining matching blocks of the first and second images to generate blocks of a registered image after using the block comparison engine to compare the blocks of the first and second images.

22. The non-transitory computer-readable storage medium of claim 21,
wherein the difference computations comprise subtraction operations, and
wherein combining the matching blocks comprises at least one of applying addition operations and applying averaging operations.

23. The non-transitory computer-readable storage medium of claim 20, wherein performing the image registration process includes:
receiving the blocks of the first image in a block-by-block manner;
combining the blocks of the first image with the blocks of the second image to generate registered blocks of a registered image;
buffering the blocks of the first image in a buffer arrangement such that when a given block of the first image is combined with a given block of the second image to generate a given block of the registered image, the given block of the first image is overwritten in the buffer arrangement; and
assembling the registered blocks to generate the registered image.

24. The non-transitory computer-readable storage medium of claim 20, wherein performing the image registration process includes:
combining first blocks of the first image with blocks of the second image to generate registered blocks of a registered image when a threshold level of matching is identified;
not combining second blocks of the first image with blocks of the second image when the threshold level of matching is not identified; and
for the second blocks of the first image, performing pixel based comparisons relative to pixels of the second image, and combining one or more pixels of the second blocks of the first image with pixels of the second image to generate registered pixels.

25. The non-transitory computer-readable storage medium of claim 20, wherein performing the image registration process includes combining blocks of two or more images to reduce jitter in a combined image relative to the two or more images.

26. The non-transitory computer-readable storage medium of claim 20, wherein performing the image registration process includes combining blocks of two or more images to fuse a sequence of images into one picture.

27. The non-transitory computer-readable storage medium of claim 20, wherein performing the image registration process includes combining blocks of the first and second images, and wherein the first and second images are captured using different exposures.

28. A device comprising:
means for performing a video coding process on image frames of a video sequence, wherein means for performing the video coding process includes means for comparing video blocks of an image frame being coded to video blocks of a search space using a block comparison engine; and
means for performing an image registration process, wherein means for performing the image registration process includes means for comparing blocks of a first image to blocks of a second image using the block comparison engine.

29. The device of claim 28,
wherein means for performing the video coding process includes means for performing motion estimation using the block comparison engine, means for performing motion compensation, and means for performing difference computations between the video blocks of the image frame being coded and matching video blocks of the search space, and
wherein the means for performing the image registration process includes means for performing combination of matching blocks of the first and second images to generate blocks of a registered image.

30. The device of claim 29,
wherein the means for performing difference computations comprises means for performing subtraction operations, and
wherein the means for performing combination of matching blocks comprises at least one of: means for performing addition operations and means for performing averaging operations.

31. The device of claim 28, wherein means for performing the image registration process includes:
means for receiving the blocks of the first image in a block-by-block manner;
means for combining the blocks of the first image with the blocks of the second image to generate registered blocks of a registered image;
means for buffering the blocks of the first image in a buffer arrangement such that when a given block of the first image is combined with a given block of the second image to generate a given block of the registered image, the given block of the first image is overwritten in the buffer arrangement; and
means for assembling the registered blocks to generate the registered image.

32. The device of claim 28, wherein means for performing the image registration process includes:
means for combining first blocks of the first image with blocks of the second image to generate registered blocks of a registered image when a threshold level of matching is identified;
means for not combining second blocks of the first image with blocks of the second image when the threshold level of matching is not identified; and
for the second blocks of the first image, means for performing pixel based comparisons relative to pixels of the second image, and means for combining one or more pixels of the second blocks of the first image with pixels of the second image to generate registered pixels.

33. The device of claim 28, wherein means for performing the image registration process includes means for combining blocks of two or more images to reduce jitter in a combined image relative to the two or more images.

34. The device of claim 28, wherein means for performing the image registration process includes means for combining blocks of two or more images to fuse a sequence of images into one picture.

35. The device of claim 28, wherein means for performing the image registration process includes means for combining blocks of the first and second images, wherein the first and second images are captured using different exposures.

* * * * *